Nov. 16, 1948.   O. G. RUTEMILLER   2,454,212
DRUM-OPERATING ELECTRIC DRIVE
Filed Feb. 29, 1944
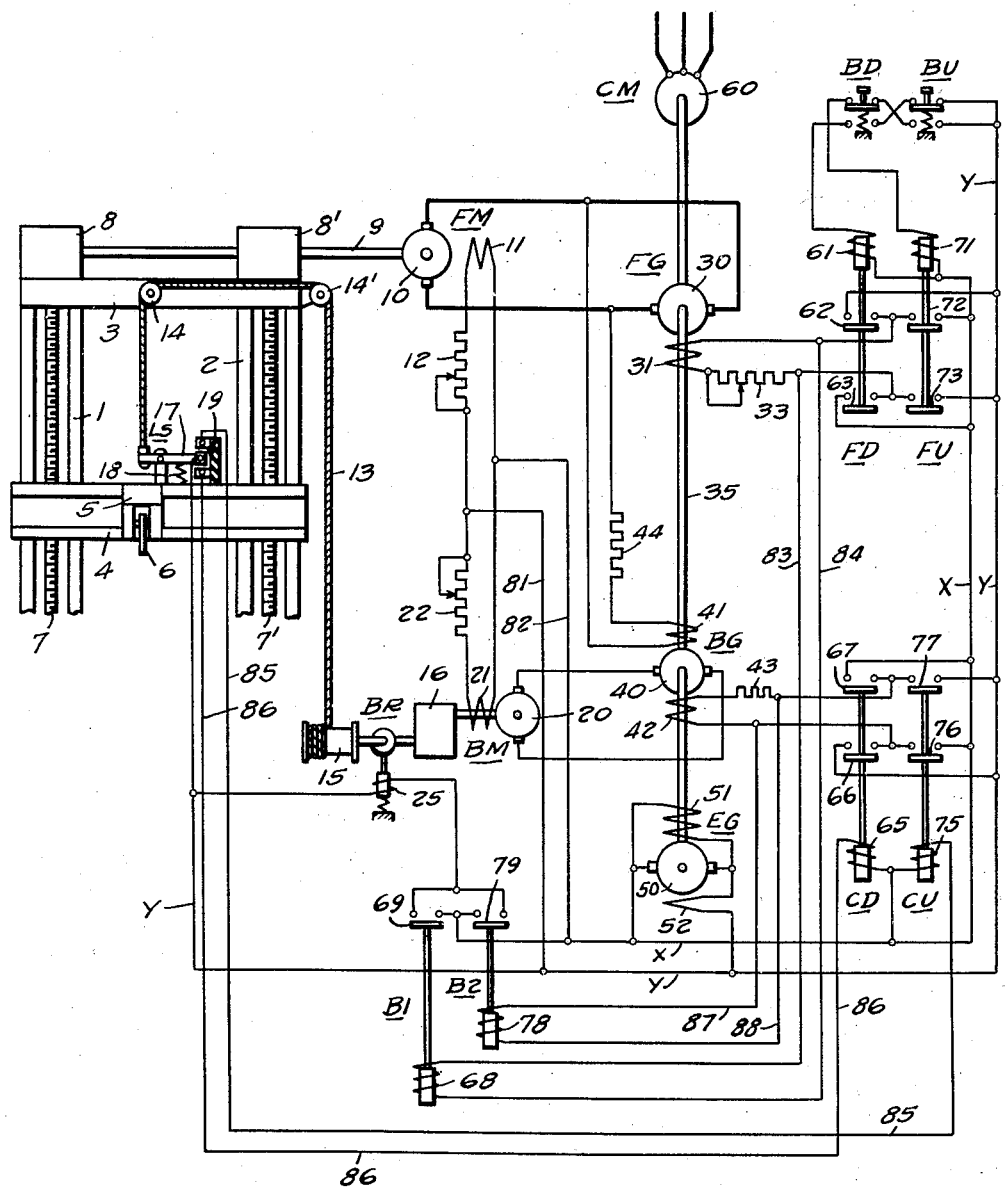
WITNESSES:
INVENTOR
Oren G. Rutemiller.
BY
Paul E. Friedemann
ATTORNEY Patented Nov. 16, 1948

2,454,212

UNITED STATES PATENT OFFICE 2,454,212

DRUM-OPERATING ELECTRIC DRIVE

Oren G. Rutemiller, St. Bernard, Ohio, assignor to Westinghouse Electric Corporation, East Pittsburgh, Pa., a corporation of Pennsylvania Application February 29, 1944, Serial No. 524,399

9 Claims. (Cl. 318—39)

My invention relates to electric motor control systems for operating hoist or winch type drum drives and, in a more specific aspect, to electrically controlled machine tools which have a hoist type section for moving a traverse or planing head in a vertical direction relative to the stationary frame or bed portion of the machine.

It is an object of the invention to provide a control system in which the position of a movable body, for instance the just-mentioned traverse or head, is automatically controlled to maintain a selected position relative to a stationary or reference body.

Another object of the invention is to devise a machine tool or other apparatus having a vertically movable body, in which the weight of the body is balanced under elimination of part or all of the counterpoise heretofore used for such balancing purposes. In machine tools, for instance, the counterpoise for balancing the weight of a vertically movable tool or work carrier is often a substantial portion of the total weight, and it is also an object of my invention to reduce this total weight by diminishing the weight of the counterbalance equipment of the machine.

The invention aims further at providing a variable voltage drive for raising and lowering heavy objects, which affords a speedy operation under control by the attendant and also an automatic operation of high accuracy for obtaining and maintaining a selected adjustment.

In order to achieve these and other objects which will become apparent from the following description, my invention requires the use of a reversible electric motor in mechanical connection with a cable drum for counterbalancing by its torque the weight or pull of a body attached to a rope or cable wound up on the drum. According to another feature of my invention, the balance motor is controlled by a device, preferably a limit switch, which is connected with the cable so as to respond to changes in cable pull or changes in payed-out cable length.

In another, more specific aspect, my invention involves a variable voltage drive for producing a main or feed motion of the body to be moved and provides an operative connection between the control means of the variable voltage drive with the above-mentioned balance motor so that the latter is also operated in dependence upon the driving function of the feed drive.

According to another feature of my invention, the balance motor is energized from a generator with two cumulative control fields, one being subject to control by a pull-responsive control device as aforementioned while the other field is energized in dependence upon the operation of the feed motor. The first-mentioned field is so dimensioned that its component effect will impart only a slow or creeping speed to the balance motor as compared with the speed of the feed motor, and the second field is designed for producing a speed slightly lower than that of the feed motor.

These different features will be understood from the following description of the embodiment of machine tool control according to the invention diagrammatically shown in the appertaining drawing. It will be understood, however, that while I am describing the invention in terms of a machine tool, some of its aspects are also applicable to other machines of comparable operation such as elevating machinery or towing winches.

Referring to the drawing, numerals 1 and 2 represent two vertical standards of a planing machine. The top portion of the two standards is firmly connected by a traverse 3. A planing head 4 forms a movable traverse between the two standards 1 and 2 and is guided thereon for vertical motion relative to the frame or bed portion (not shown) of the machine. A tool carrier 5 is slidably mounted on the planing head 4 for horizontal motion relative thereto and carries the tool 6. Two feed screws 7 and 7' disposed in the respective standards 1 and 2, engage the planing head 4. Two corresponding gear boxes 8 and 8' respectively are mounted on top of the stationary traverse 3. The angle gears contained in these boxes are driven by a feed shaft 9 which is connected with the armature 10 of an electric feed motor FM. The field winding 11 of this motor is series connected with an adjusting or calibrating resistor 12. Rotation of the feed shaft 9 causes the feed screws 7 and 7' to raise or lower the planing head 4 in accordance with the direction of rotation of the feed motor FM.

A counterbalance rope or cable 13 is at one end attached to a limit switch LS mounted on the planing head 4. The cable 13 is guided by rollers 14 and 14' and has its other end wound up on a cable drum 15. This drum is provided with a brake BR and is in mechanical connection with a gear box 16 whose input shaft is driven by a counterbalance motor BM.

The limit switch LS has a lever 17 pivoted to the planing head 4. One arm of this lever forms an abutment for the end of cable 13 while the other arm is in engagement with a compression spring 18 which abuts against the planing head 4. A contact device 19 having an upper and lower limit contact is associated with the planing head and the lever 17 of the limit switch LS. When the pull of cable 13 balances the compressive force of the spring 18, that is, when the weight and load of the planing head 4 are balanced by the torque of motor BM, the contact carried by the lever 17 assumes an intermediate position so that neither the upper limit contact nor the lower limit contact of device 19 is closed. If the pull of cable 13 exceeds the weight of the head 4 the lower contact of device 19 will be closed. Similarly if the cable pull is less than the weight of the head the upper contact will be closed.

The armature 20 of motor BM is acted upon by the appertaining field winding 21 whose excitation is adjusted by means of a rheostat 22. Both the feed motor FM and the balance motor BM are reversible direct-current motors and form each part of a variable voltage drive of the Ward-Leonard type. The armature 10 of the feed motor FM is connnected to the armature 30 of a feed generator FG whose output voltage is controlled by a field winding 31, an appertaining adjusting or calibrating resistor being indicated at 33. Similarly, the armature 20 of the balance motor BM is connected with the armature 40 of a balance generator BG so as to be operated at a speed depending upon the output voltage of this generator. Two field windings 41 and 42 are provided on the generator BG for controlling this output voltage. The field winding 42 contains in its circuit a calibrating resistor 43. The field winding 41, in series connection with another calibrating resistor 44, is connected with the armature circuit of the feed motor FM in such a manner as to be excited in dependence upon and in proportion to the voltage imposed by the feed generator FG on the feed motor FM. As a rule, the adjustment of the above-mentioned rheostats need not be changed during the operation of the system once a proper rheostat setting has been chosen.

The armatures 30 and 40 of the two generators FG and BG, respectively, form part of a motor generator set and are mounted on a common shaft 35. This shaft carries also the armature 50 of an exciter generator EG which forms a convenient direct-current source for energizing the control system. The exciter generator is shown as having a self-excited shunt field 51 and a series field 52 connected to the output mains X and Y.

A constant speed motor CM has its armature 60 connected with the shaft 35 of the above-mentioned generators. Motor CM may consist of a synchronous motor or an induction motor if an alternating-curent line is available, although any other type of constant speed motor may be used instead.

Two push buttons BD and BU are provided for the manual control of the system. These buttons are to be operated by the attendant in accordance with the desired lifting or lowering operations. A relay FD, having a control coil 61 and two relay contacts 62 and 63, serves to connect the field winding 31 of the feed generator FG with the exciter mains X and Y when the button BD is pressed for lowering the planing head. A similar relay FU, having a coil 71 and two contacts 72 and 73, serves to energize the field winding 31 in the opposite direction when the button BU is pressed for lifting the planing head 4. Two further relays CD and CU, each having a coil 65, 75 and a pair of contacts 66 and 76 and 67, 77, respectively, are provided for controlling the field winding 42 of the balance generator BG so as to excite the balance motor BM for operation in a direction corresponding to that of the feed motor FM.

A third pair of relays B1 and B2 have their respective contacts 69 and 79 connected with the releasing coil 25 of the brake BR. This brake is of the electromagnetic type and is normally set for operation.

As apparent from the foregoing description, the field winding 41 of generator BG remains energized as long as the feed motor FM is in operation and causes the armature 40 to impose a voltage on the balance motor BM in proportion to the voltage and hence the speed of the feed motor FM. However, as mentioned, the speed of the balance motor BM thus produced is slightly lower than that of the feed motor FM. Consequently, any operation of the feed motor will cause the limit switch LS to operate. As a result, the field winding 42 will also become energized and will impart an additional creeping speed to motor BM in order to compensate for the above-mentioned speed difference.

The control system is placed in condition for operation by energizing the drive motor CM of the motor generator set. As long as neither button BD nor BU is actuated, the feed motor FM and balance motor BM remain at rest, so that the planing head 4 maintains its position relative to the stationary structure of the machine tool. When the button BD is pressed, coil 61 of relay FD is energized from exciter mains Y and X through released button BU and depressed button BD. Relay FD closes contacts 62 and 63 and thereby connects field winding 31 of feed generator FG to mains X and Y. Since the field winding 11 of motor FM is supplied with constant excitation from exciter mains X and Y through leads 82 and 81 respectively, the feed motor FM is now operated and rotates the feed shaft 9 and the feed screws 7 and 7' in the lowering direction of the planing head 4. The closure of contacts 62 and 63 has also the effect of connecting mains X and Y with the circuit leads 83 and 84 of coil 68, thereby causing the brake relay B1 to release the brake. Since the field winding 41 of generator BG is excited simultaneously with the feed motor FM and in the corresponding direction, the balance motor BM will now operate the drum 15 so as to pay out an amount of cable which is slightly less than that required for a complete follow-up motion so that the lower contact of device 19 is closed. This connects lead 86 to the exciter main Y and causes the coil 65 of relay CD to close contacts 66 and 67 thereby exciting the creep field winding 42. Simultaneously, coil 78 of brake relay B2 is energized from mains X and Y through leads 87 and 88 and the brake relay B2 closes its contact 79.

The simultaneous operation of motors FM and BM continues as long as button BD is kept depressed by the attendant. When the button is released, the excitation of field winding 31 is immediately interrupted and the feed motor FM stopped. At the same time, field winding 41 of generator BG becomes ineffective and coil 68 of brake relay B1 is deenergized. However, since at first the limit switch LS is closed, relay CD remains temporarily energized and the brake BR stays lifted because the brake relay B2 is still operative. The creep field winding 42 of generator BG now produces a follow-up and calibrating motion of the balance motor BM until the planing head 4 has reached the position in which its weight or load is balanced by the torque of motor BR. Upon reaching this condition, the lower contact of device 19 is opened and the relay CD deenergized, thereby disconnecting the creep field winding 42 as well as the brake relay B2. Hence, the brake BR becomes effective.

When pressing button BU, the relay FU is energized and causes the feed motor FM and the balance motor BM to operate substantially in the same manner as described in the foregoing, except that the motion of both motors is now in the lifting direction of the planing head. The above-mentioned difference in motor speeds causes the limit switch LS to close its upper contact, thereby energizing relay CU through lead 85. Consequently, the creep field winding 42 and the two brake relays B1 and B2 operate also in the above described manner. As a result, the planing head is lifted until the button BU is released. Thereafter the creep field winding is effective to adjust the system to its balance condition.

It will be understood from the foregoing explanation that the balance motor BM is always in condition for counteracting any uncontrolled change in position of the planing head. That is, if the machine is of a type where an increased or reduced load on the planing head may cause it to be lifted or lowered, then the limit switch LS will immediately become effective and will control the motor BM and the appertaining brake relay B1 or B2 to reestablish the desired position of the planing head.

According to the foregoing, a control system according to my invention requires two variable voltage drives, one providing the main feed motion while the other serves for maintaining a payed-out length of cable within predetermined limits which are determined by the amount of cable pull or torque or by the payed-out amount of cable length between the drum or winch 15 and the point of attachment to the movable member whose relative position is to be controlled.

Since it will be obvious to those skilled in the art upon studying the foregoing disclosure that a drum-operating electric drive in accordance with the principles of my invention can be applied to other machines and apparatus than planing or milling machines, and permits of being modified as to details without departing from it essential objects and features, I wish this specification to be understood as illustrative rather than in a limiting sense.

I claim as my invention:

1. A pay-out control system comprising means disposed for connecting two relatively movable objects and including a connecting cable and an appertaining cable drum, a feed motor mechanically conducted to said means for selectively varying the position of said objects relative to each other, a regulating motor in driving connection with said drum, an electric energizing circuit having pay-out control means and being connected to both said motors so as to operate them in unison when varying said relative position, and regulating means responsive to the pull of said cable and connected with said regulating motor for controlling the latter so as to substantially maintain a selected position.

2. A machine having a vertically movable machine portion, feed means for raising and lowering said portion, a counterbalance cable attached to said portion and a cable drum accommodating said cable, a torque motor connected with said drum, pull responsive means for controlling said motor in dependence upon the pull of said cable so as to cause said motor to substantially balance the weight of said portion, a feed motor for actuating said feed means, and electric circuit means connected to said two motors for controlling them simultaneously so as to cause said torque motor and drum to pay out and pull in said cable when said portion is lowered and raised respectively by said feed motor and feed means.

3. A machine having a vertically movable machine portion, feed means for raising and lowering said portion, a counterbalance cable attached to said portion and a cable drum accommodating said cable, a torque motor connected with said drum, pull responsive means for controlling said motor in dependence upon the pull of said cable so as to cause said motor to substantially balance the weight of said portion, a feed motor for actuating said feed means, and an electric circuit for controlling said motors including two interconnected field windings on said torque motor and said feed motor respectively so that one of said windings causes said torque motor to pay out and pull in said cable when said other field winding causes said portion to be lowered and raised respectively by said feed motor.

4. A machine having a vertically movable machine portion, feed means for raising and lowering said portion, a counterbalance cable attached to said portion and a cable drum accommodating said cable, a torque motor connected with said drum, pull responsive means for controlling said motor in dependence upon the pull of said cable so as to cause said motor to substantially balance the weight of said portion, a feed motor for actuating said feed means, and two interconnected variable voltage drives including said two motors and having a common master control so as to cause said torque motor to pay out and pull in said cable when said portion is lowered and raised respectively by said feed motor.

5. A control system for a machine having a vertically movable machine portion, comprising a feed motor for raising and lowering said portion, a counterbalance cable attached to said portion and a cable drum accommodating said cable, a torque motor connected with said drum, a normally operative brake for stopping said drum, variable voltage means for controlling said two motors so as to cause both to operate simultaneously in the same sense as regards the motion of said portion, pull responsive means for controlling said torque motor in dependence upon the pull of said cable so as to cause said torque motor to substantially balance the weight of said portion, said two control means being connected with said brake so as to release the latter during the controlled operation of said motors.

6. A pay-out control system for a drum-operating electric drive, comprising connecting means disposed for connecting two relatively movable objects and including a connecting cable and an appertaining cable drum, a feed motor mechanically connected to said means for selectively varying the position of said objects relative to each other, a regulating motor in driving connection with said drum, normally operative braking means for stopping said drum, pay-out control means connected to both said motors so as to operate them in unison when varying said relative position, and regulating means responsive to the pull of said cable and connected with said regulating motor for controlling the latter so as to maintain said position substantially constant according to selection, said control means and regulating means being also connected with said braking means for releasing said drum when said motors are in operation.

7. A system for controlling the position of a vertically movable body, comprising a cable and means for attaching said cable to said body, a cable drum engaged by said cable, a torque motor connected with said drum for substantially counterbalancing the weight of said body, means responsive to the pull of said cable for controlling said motor, drive means for raising and lifting said body, means for controlling said drive means, and braking means disposed for stopping said drum and connected with both said control means so as to release said drum when either control means is in operation.

8. A control system for a machine having a vertically movable body and feed means for raising and lowering said body, comprising in combination an electric drive for actuating said feed means, a cable, means for attaching said cable to said body, a drum for accommodating said cable, a torque motor connected with said drum for substantially counterbalancing the weight of said body, a generator having an output circuit connected with said motor for energizing the latter, said generator having two field windings for controlling the voltage of said circuit, one of said windings being connected with said drive so as to be energized in accordance with the operation of said drive, and pull responsive control means connected with said other winding for energizing it in dependence upon the pull of said cable.

9. A control system for a machine having a vertically movable body and feed means for raising and lowering said body, comprising an electric drive for actuating said feed means, a cable to be attached to said body, an appertaining cable drum, a torque motor connected with said drum for substantially counterbalancing the weight of said body, a generator having an output circuit connected with said motor for energizing the latter, said generator having two field windings for controlling the voltage of said circuit, one of said windings being connected with said drive so as to be energized in accordance with the operation of said drive so as to move said cable at a speed lower than that of said drive, and pull responsive control means connected with said other winding for energizing it in dependence upon the pull of said cable so as to move said cable at a still lower speed.

OREN G. RUTEMILLER.

REFERENCES CITED

The following references are of record in the file of this patent:

UNITED STATES PATENTS

| Number | Name | Date |
|---|---|---|
| 1,601,317 | Mylius | Sept. 28, 1926 |
| 1,925,012 | Taylor | Aug. 29, 1933 |